(12) United States Patent
Sodagar

(10) Patent No.: US 11,533,346 B2
(45) Date of Patent: Dec. 20, 2022

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/477,243

(22) Filed: Sep. 16, 2021

(65) Prior Publication Data

US 2022/0217188 A1 Jul. 7, 2022

Related U.S. Application Data

(60) Provisional application No. 63/134,045, filed on Jan. 5, 2021.

(51) Int. Cl.
*G06F 15/16* (2006.01)
*H04L 65/401* (2022.01)
*H04L 67/146* (2022.01)
*H04L 67/02* (2022.01)

(52) U.S. Cl.
CPC .......... *H04L 65/401* (2022.05); *H04L 67/02* (2013.01); *H04L 67/146* (2013.01)

(58) Field of Classification Search
CPC ...... H04L 65/401; H04L 67/02; H04L 67/146
USPC ........................................................ 709/231
See application file for complete search history.

(56) References Cited

U.S. PATENT DOCUMENTS

| | | | | |
|---|---|---|---|---|
| 9,342,668 | B2* | 5/2016 | Wang | H04N 21/2541 |
| 9,385,998 | B2* | 7/2016 | Wang | H04L 63/0428 |
| 9,419,973 | B2* | 8/2016 | Oyman | H04L 63/126 |
| 9,807,452 | B2* | 10/2017 | Freeman | H04N 21/4381 |
| 9,813,404 | B2* | 11/2017 | Oyman | H04L 63/08 |
| 11,095,537 | B2* | 8/2021 | Gholmieh | H04L 43/08 |
| 11,310,540 | B2* | 4/2022 | Lo | H04N 21/4307 |
| 2013/0144834 | A1 | 6/2013 | Lloyd et al. | |

(Continued)

OTHER PUBLICATIONS

"Information technology—Dynamic adaptive streaming over HTTP (DASH)—Part 8: Session-based DASH operations," N19641, ISO/IEC, Jul. 10, 2020 (27 pages).

(Continued)

*Primary Examiner* — Moustafa M Meky
(74) *Attorney, Agent, or Firm* — ArentFox Schiff LLP

(57) ABSTRACT

Aspects of the disclosure include methods, apparatuses, and non-transitory computer-readable storage mediums for receiving media data. One apparatus includes processing circuitry that receives a media presentation description (MPD) file that includes an essential property descriptor for session-based dynamic adaptive streaming over hypertext transfer protocol (DASH). The essential property descriptor indicates a session-based description (SBD) file and includes a set of keys for a part of a uniform resource locator (URL) that is used for receiving the media data. The processing circuitry determines a respective value for each of the set of keys based on whether the respective value is included in the SBD file and modifies the URL based on the set of keys and the determined values.

20 Claims, 5 Drawing Sheets

(56) References Cited

U.S. PATENT DOCUMENTS

| | | | |
|---|---|---|---|
| 2014/0013103 A1* | 1/2014 | Giladi | H04L 63/0428 |
| | | | 713/150 |
| 2014/0013375 A1 | 1/2014 | Giladl | |
| 2014/0020111 A1* | 1/2014 | Wang | H04L 65/765 |
| | | | 726/26 |
| 2015/0100996 A1* | 4/2015 | Freeman | H04N 21/85406 |
| | | | 725/110 |
| 2015/0350205 A1* | 12/2015 | Oyman | H04L 65/762 |
| | | | 726/7 |
| 2016/0261665 A1 | 9/2016 | Stockhammer et al. | |
| 2016/0344706 A1* | 11/2016 | Giladi | H04L 63/168 |
| 2018/0069856 A1* | 3/2018 | Oyman | H04L 9/3247 |

OTHER PUBLICATIONS

International Search Report dated Dec. 14, 2021 in Application No. PCT/US2021/051552, (13 pages).

\* cited by examiner

METHODS AND APPARATUSES FOR DYNAMIC ADAPTIVE STREAMING OVER HTTP

INCORPORATION BY REFERENCE

This present application claims the benefit of priority to U.S. Provisional Application No. 63/134,045, "EXTENDED URL CUSTOMIZATION IN THE SESSION-BASED DASH OPERATIONS," filed on Jan. 5, 2021, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over Internet Protocol (IP) networks. The DASH standard allows carrying event message boxes in media segments.

SUMMARY

Aspects of the disclosure provide apparatuses for receiving media data. One apparatus includes processing circuitry that receives a media presentation description (MPD) file that includes an essential property descriptor for session-based dynamic adaptive streaming over hypertext transfer protocol (DASH). The essential property descriptor indicates a session-based description (SBD) file and includes a set of keys for a part of a uniform resource locator (URL) that is used for receiving the media data. The processing circuitry determines a respective value for each of the set of keys based on whether the respective value is included in the SBD file and modifies the URL based on the set of keys and the determined values.

In an embodiment, the part of the URL is one of a host part, a port part, a path part, and a fragment part of the URL.

In an embodiment, the set of keys is one of (i) a set of URL host keys, (ii) a set of URL port keys, (iii) a set of URL path keys, and (iv) a set of URL fragments keys.

In an embodiment, the processing circuitry determines whether a value for one of the set of keys is included in the SBD file. The processing circuitry determines the value included in the SBD file for the one of the set of keys based on the value for the one of the set of keys being included in the SBD file. The processing circuitry determines the value for the one of the set of keys to be a default value based on the value for the one of the set of keys not being included in the SBD file. The default value is included in the essential property descriptor.

In an embodiment, the set of keys is indicated by a template included in the essential property descriptor. The processing circuitry processes the template based on the determined values. The template corresponds to the part of the URL. The processing circuitry modifies the URL based on the processed template.

In an embodiment, the template is a fragment template based on the part of the URL being a fragment part.

In an embodiment, the set of keys is included in the part of the URL and indicated by a key element that is included in the essential property descriptor and corresponds to the part of the URL. The processing circuitry replacing, for each of the set of keys, a first occurrence of the respective key in the part of the URL with the determined corresponding value.

In an embodiment, the key element is one of a URL host key element, a URL port key element, a URL path key element, and a URL fragment key element.

In an embodiment, the part of the URL is one of a plurality of parts of the URL, and the essential property descriptor includes a first flag indicating whether a full match of all the parts of the URL is required. The processing circuitry determines that the URL is not to be modified based on at least one part of the URL not being modified and the first flag indicating that the full match of all parts of the URL is required. The processing circuitry determines that the URL is to be modified based on the at least one part of the URL being modified and the first flag indicating that the full match of all parts of the URL is not required.

In an embodiment, the essential property descriptor includes a second flag indicating whether a full match of all keys for the part of the URL is required. The processing circuitry determines that the part of the URL is not to be modified based on at least one key for the part of the URL not being included in the SBD file and the second flag indicating that the full match of all keys for the part of the URL is required. The processing circuitry determines that the part of the URL is to be modified based on the at least one key for the part of the URL being included in the SBD file and the second flag indicating that the full match of all keys for the part of the URL is not required.

Aspects of the disclosure provide methods for receiving media data. The methods can include one or a combination of steps performed by the apparatuses. In one method, an MPD file that includes an essential property descriptor for session-based DASH is received. The essential property descriptor indicates an SBD file and includes a set of keys for a part of a URL that is used for receiving the media data. A respective value for each of the set of keys is determined based on whether the respective value is included in the SBD file. The URL is modified based on the set of keys and the determined values.

Aspects of the disclosure also provide non-transitory computer-readable mediums storing instructions which when executed by a computer for receiving media data cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
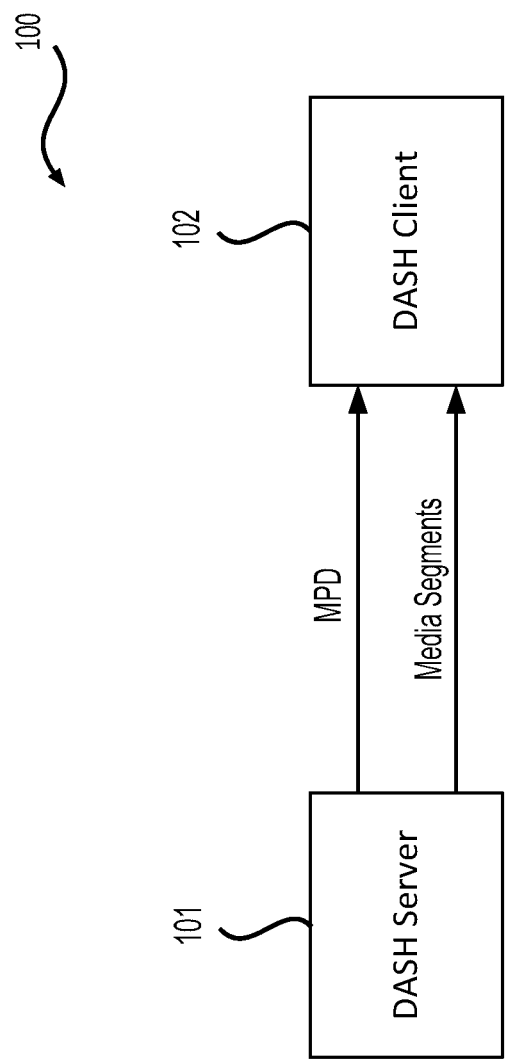
FIG. 1 shows an exemplary dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client. However, in some related examples, the session-based DASH operation is application-specific. That is, for each new application, a new SBD format is required.

This disclosure includes methods for customizing or modifying a URL in a session-based DASH.

FIG. 1 shows an exemplary DASH system (100) according to an embodiment of the disclosure. In the DASH system (100), an MPD file is sent from a DASH server (101) (e.g., a content server) to a DASH client (102). The DASH client (102) can receive media segments from a server, such as the DASH server (101), based on the MPD file. The DASH client (102) can send a request to the DASH server (101) for updating the MPD file. The DASH server (101) can provide a content stream, including primary content (e.g., a main program) and one or more timed metadata tracks. In addition, the DASH client (102) can receive an SBD file from a server, such as the DASH server (101) or a third party (e.g., session controller).

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
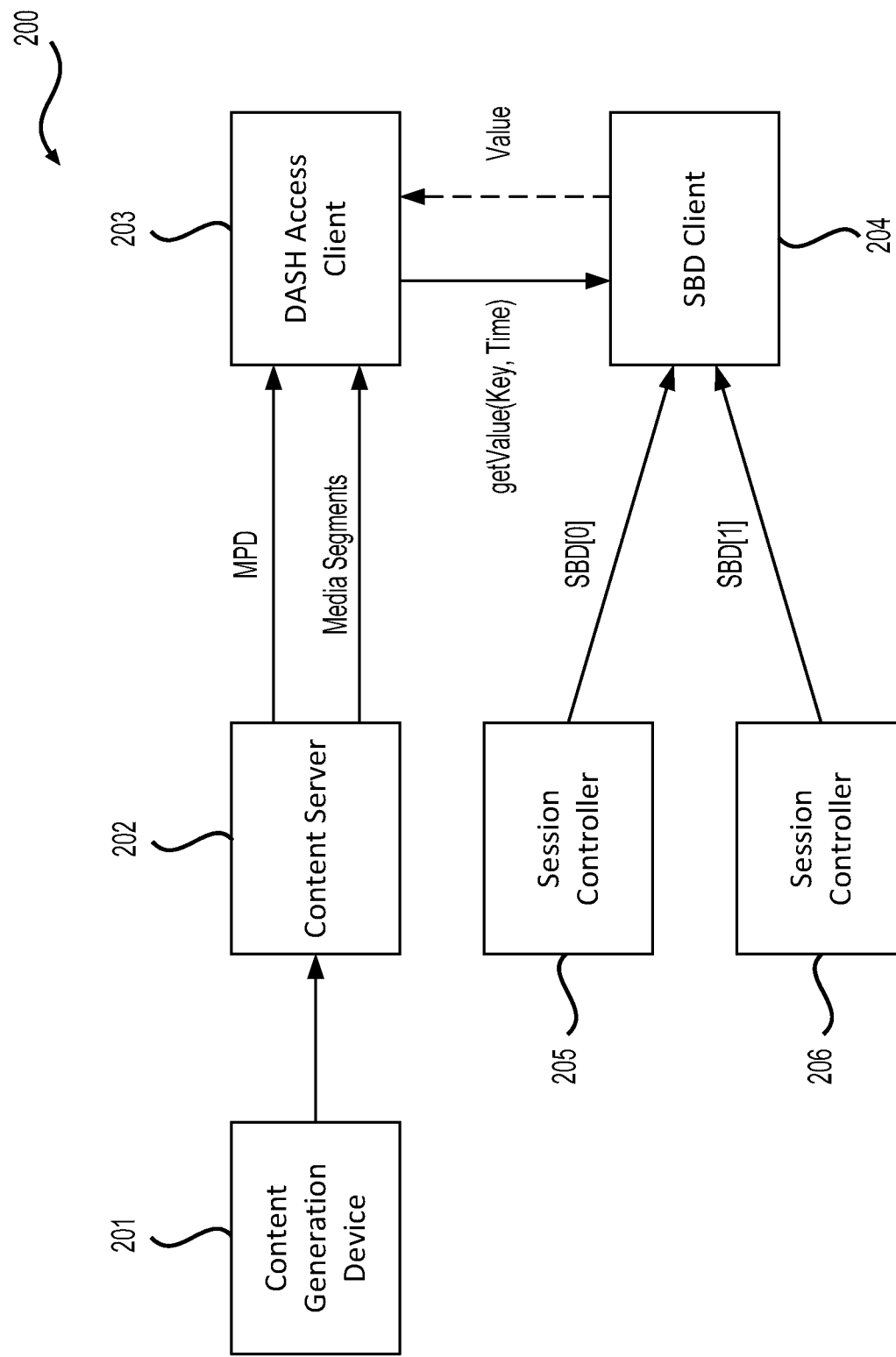
FIG. 2 shows another exemplary session-based DASH system according to an embodiment of the disclosure.

FIG. 2 shows another exemplary session-based DASH operation architecture 200 according to an embodiment of the disclosure. In the session-based DASH operation architecture 200, multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) to access an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

According to aspects of the disclosure, in order to link multiple SBDs to an MPD, one or more essential property descriptors for session-based DASH can be used at an MPD level and each essential property descriptor for session-based DASH includes similar or same essential property descriptor attributes. Note that presentation descriptor can be either an essential property descriptor or a supplemental property descriptor. For an essential property, the media presentation author expresses that the successful processing of the descriptor is essential to properly use the information in the parent element that contains this descriptor unless the element shares the same @id with another EssentialProperty element. By contrast, for a supplemental property, the media presentation author expresses that the descriptor contains supplemental information that may be used by the DASH Client for optimized processing.

Figure 3:
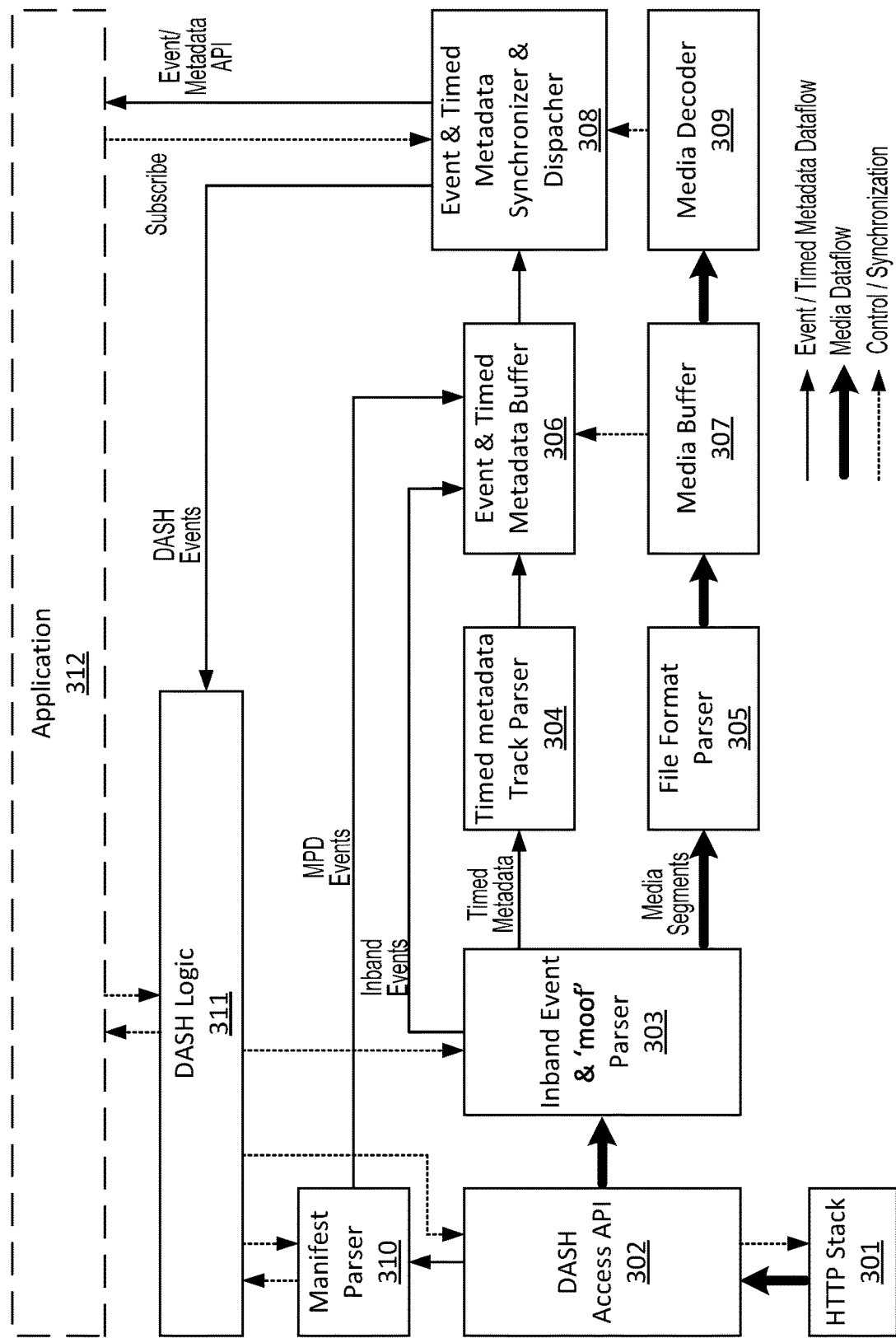
FIG. 3 shows an exemplary DASH client architecture according to an embodiment of the disclosure.

FIG. 3 shows an exemplary DASH client architecture according to an embodiment of the disclosure. The DASH client (or DASH player) can be configured to communicate with an application (312) and process various types of events, including (i) MPD events, (ii) inband events, and (iii) timed metadata events.

A manifest parser (310) can parse a manifest (e.g., an MPD). The manifest can be provided by the DASH server (101) for example. The manifest parser (310) can extract event information about MPD events, inband events, and timed metadata events embedded in timed metadata tracks. The extracted event information can be provided to a DASH logic (311) (e.g., DASH player control, selection, and heuristic logic). The DASH logic (311) can notify the application (312) of event schemes signaled in the manifest based on the event information.

The event information can include event scheme information for distinguishing between different event streams. The application (312) can use the event scheme information to subscribe to event schemes of interest. The application (312) can further indicate a desired dispatch mode for each of the subscribed schemes through one or more subscription application programming interfaces (APIs). For example, the application (312) can send a subscription request to the DASH client that identifies one or more event schemes of interest and any desired corresponding dispatch modes.

If the application (312) subscribes to one or more event schemes that are delivered as part of one or more timed metadata tracks, an inband event and 'moof' parser (303)

can stream the one or more timed metadata tracks to a timed metadata track parser (304). For example, the inband event and 'moof' parser (303) parses a movie fragment box ("moof") and subsequently parses the timed metadata track based on control information from the DASH logic (311).

The timed metadata track parser (304) can extract event messages embedded in the timed metadata track. The extracted event messages can be stored in an event and timed metadata buffer (306). A synchronizer/dispatcher module (308) (e.g., event and timed metadata synchronizer and dispatcher) can dispatch (or send) the subscribed events to the application (312).

MPD events described in the MPD can be parsed by the manifest parser (310) and stored in the event and timed metadata buffer (306). For example, the manifest parser (310) parses each event stream element of the MPD, and parses each event described in each event stream element. For each event signaled in the MPD, event information such as presentation time and event duration can be stored in the event and timed metadata buffer (306) in association with the event.

The inband event and 'moof' parser (303) can parse media segments to extract inband event messages. Any such identified inband events and associated presentation times and durations can be stored in the event and timed metadata buffer (306).

Accordingly, the event and timed metadata buffer (306) can store therein MPD events, inband events, and/or timed metadata events. The event and timed metadata buffer (306) can be a First-In-First-Out (FIFO) buffer, for example. The event and timed metadata buffer (306) can be managed in correspondence with a media buffer (307). For example, as long as a media segment exists in the media buffer (307), any events or timed metadata corresponding to that media segment can be stored in the event and timed metadata buffer (306).

A DASH Access API (302) can manage the fetching and reception of a content stream (or dataflow) including media content and various metadata through an HTTP protocol stack (201). The DASH Access API (302) can separate the received content stream into different dataflows. The dataflow provided to the inband event and 'moof' parser (303) can include media segments, one or more timed metadata tracks, and inband event signaling included in the media segments. In an embodiment, the dataflow provided to the manifest parser (310) can include an MPD.

The DASH Access API (302) can forward the manifest to the manifest parser (310). Beyond describing events, the manifest can also provide information on media segments to the DASH logic (311), which can communicate with the application (312) and the inband event and 'moof' parser (303). The application (312) can be associated with the media content processed by the DASH client. Control/synchronization signals exchanged among the application (312), the DASH logic (311), the manifest parser (310), and the DASH Access API (302) can control the fetching of media segments from the HTTP Stack (201) based on information regarding media segments provided in the manifest.

The inband event and 'moof' parser (303) can parse a media dataflow into media segments including media content, timed metadata in a timed metadata track, and any signaled inband events in the media segments. The media segments including media content can be parsed by a file format parser (305) and stored in the media buffer (307).

The events stored in the event and timed metadata buffer (306) can allow the synchronizer/dispatcher (308) to communicate to the application (312) the available events (or events of interest) related to the application (312) through an event/metadata API. The application (312) can be configured to process the available events (e.g., MPD events, inband events, or timed metadata events) and subscribe to particular events or timed metadata by notifying the synchronizer/dispatcher (308). Any events stored in the event and timed metadata buffer (306) that are not related to the application (312), but are instead related to the DASH client itself can be forwarded by the synchronizer/dispatcher (308) to the DASH logic (311) for further processing.

In response to the application (312) subscribing to particular events, the synchronizer/dispatcher (308) can communicate to the application (312) event instances (or timed metadata samples) corresponding to event schemes to which the application (312) has subscribed. The event instances can be communicated in accordance with a dispatch mode indicated by the subscription request (e.g., for a specific event scheme) or a default dispatch mode. For example, in an on-receive dispatch mode, event instances may be sent to the application (312) upon receipt in the event and timed metadata buffer (306). On the other hand, in an on-start dispatch mode, event instances may be sent to the application (312) at their associated presentation time, for example in synchronization with timing signals from the media decoder (309).

It is noted that, in the DASH client architecture, the thick dataflow lines indicate media dataflow, the narrow dataflow lines indicate even and timed metadata dataflow, and the dash dataflow lines indicates control and synchronization. In addition, the same processing model can be used for CMAF events.

III. URL Customization in the Session-Based DASH Operations

Session-based DASH operation is an important approach to customize the MPD per session and possibly per client. However, in some related examples, only a single key replacement can be allowed in each part of a given URL that is used for receiving media data. In addition, certain customizations, such as a fragment customization, may not be supported in the given URL and/or a manipulation of the given URL is not allowed. Furthermore, a part of the given URL can be only replaced with a template after the template is processed. Some operations such as modifying only a subset of parts instead of all parts of the given URL may result in the modified URL invalid in some cases.

This disclosure includes methods of modifying or customizing a part of the given URL with multiple keys. The disclosure also includes methods of adding a template in an MPD file for a fragment part of the given URL. The disclosure includes methods of manipulating a part of the given URL without using a processed template. In addition, the disclosure includes methods of avoiding a creation of an invalid URL part or an invalid entire URL, if a perfect match is necessary or required at a corresponding level.

According to aspects of the disclosure, an MPD file can include an essential property descriptor for an SBD file. The essential property descriptor can be referred to as an SBD descriptor. The SBD descriptor can include one or more elements or templates, of which each can be used for allowing multiple key replacements in a corresponding part of a URL. For example, the SBD descriptor can include a URL fragment template for modifying a fragment part of a URL. In addition, the SBD descriptor can include one or more flags to avoid a partial replacement of a URL template, if the partial replacement can result in an invalid URL part and/or an invalid entire URL.

A URL can include a host part, a port, a path part, and/or a fragment part. For example, a typical URL can be expressed as URI=scheme:[//authority]path[?query][#fragment], where the authority part can be expressed as authority=[userinfo@]host[:port].

To enable multiple key replacements for a part of a URL, a URL customization process can be performed as follows. First, a template corresponding to the URL part can be allowed to include multiple keys. Then, the keys for the URL part can be grouped together.

In the URL customization process, if a fragment part of the URL is to be customized or modified, a template corresponding to the URL fragment and a key list for the URL fragment can be included in the SBD descriptor. In an embodiment, the URL fragment can be customized or modified as follows. First, a fragment template with one or more $key$ can be included in an MPD essential property descriptor (e.g., the SBD descriptor). The 'key' is a name of a parameter to be replaced in the URL fragment. The MPD essential property descriptor can also include the key list (e.g., a list of one or more keys) for customizing the URL fragment. Then, a DASH client can pass the URL to an SBD client after parsing the MPD essential property descriptor. The SBD client, for each key provided in the key list, searches an SBD file to determine whether the respective key matches a corresponding value in the SBD file. If the key is matched, the SBD client can process the fragment template by replacing the corresponding $key$ in the fragment template with the matched value. If the key is not matched, the SBD client can process the fragment template by replacing the corresponding $key$ in the fragment template with a default value for the key. In an example, the default value for the key is indicated by the key list included in the MPD file. Finally, the SBD client can customize or modify the URL fragment based on the processed fragment template.

In an embodiment, a URL part can be modified or manipulated without using a processed template. That is, the keys in the URL part can be replaced without using the processed template. For example, if a key occurs in the URL part at least once and is also included in the SBD file, a first occurrence of the key in the URL part can be replaced with a corresponding matched value in the SBD file. The key can be indicated by a corresponding element in the SBD descriptor. For example, a host key can be indicated by a host element.

In some related examples, if one or more but not all URL parts are modified to generate a modified URL, the modified URL may be invalid. To avoid generating an invalid modified or customized URL, a first flag such as a URL full match flag can be signaled in the SBD descriptor included in the MPD file in an embodiment. The first flag can indicate whether a full match of all parts of the URL is acceptable or required.

In some related examples, if one or more but not all keys in a URL part are replaced to generate a modified URL part, the modified URL part may be invalid. To avoid generating an invalid modified or customized URL part, a second flag such as a URL part full match flag can be signaled in the SBD descriptor included in the MPD file. The second flag can be signaled for one or each part of the URL. The second flag can indicate whether a full match of all keys of the URL part is acceptable or required.

According to aspects of the disclosure, an essential property descriptor for an SBD file (e.g., an SBD descriptor) included in an MPD file can be extended to include one or more elements and/or attributes to signal the above features. An exemplary extended version of the SBD descriptor can be shown in Table 1.

One way to modify a URL part with multiple keys can be achieved by using one of attributes @hostTemplate, @portTempalte, @pathTemplate, and @fragmentTempalte included in the SBD descriptor, as shown in Table 1. Each of these attributes can include multiple keys for a corresponding part of the URL. For example, the attribute @hostTemplate can include multiple URL host keys for a host part of the URL. An SBD client can search an SBD file for each of the multiple URL host keys to determine whether the respective URL host key is included in the SBD file. If one of the URL host keys is included in the SBD file, the SBD client can determine a value matched to the URL host key and modify a corresponding part of a host template with the matched value. The host template can be indicated by the attribute @hostTemplate. The SBD file can be indicated by the attribute @value. In this way, the URL host part can be modified or customized with multiple keys.

Another way to modify a URL part with multiple keys and without using a processed template can be achieved by using elements Host, Port, Path, and/or Fragment included in the SBD descriptor, as shown in Table 1. Each of these elements can include multiple keys for a corresponding part of the URL. For example, the element Host can include multiple URL host keys for a host part of the URL. If one of the multiple URL host keys is in the URL host part, the SBD client can search the SBD file for the URL host key to determine whether the URL host key is included in the SBD file. If the URL host key is included in the SBD file, the SBD client can determine a value matched to the URL host key and replace a first occurrence of the URL host key in the URL host part with the matched value. In this way, the URL host part can be modified or customized with multiple URL host keys and without using a processed host template.

In order to avoid generating an invalid modified URL, the attribute @urlMatch can be included in the SBD descriptor, as shown in Table 1. When the attribute @urlMatch is set to be 'true' and at least one of the URL host, path, port, or fragment is not modified, other modified part(s) cannot be valid and the URL remains unchanged. When the attribute @urlMatch is set to be 'false' and at least one of the URL host, path, port, or fragment is modified, the modified part(s) can be valid and the URL can be modified based on the modified part(s). For example, if the attribute @urlMatch is set to be 'true', and the URL host part is not modified while other URL parts are modified, the modified parts are not valid and the URL remains unchanged. If the attribute @urlMatch is set to be 'false' and the URL host part is modified, the modified URL host part is valid and the URL can be modified based on the modified URL host part.

In order to avoid generating an invalid modified URL part, the attributes @hostMatch, @portMatch, @pathMatch, and/or @fragmentMatch can be included in the SBD descriptor, as shown in Table 1. If one of these attributes is set to be 'true' and at least one key in a template corresponding to the attribute is not included in the SBD file, the corresponding URL part remains unchanged. For example, if the element @hostMatch is set to be 'true' and at least one key of @hostTemplate is not included in the SBD file, then the URL host part remains unchanged. If the element @hostMatch is set to be 'false' and at least one key of @hostTemplate is included in the SBD file, then the URL host part can be modified based on the at least one key of @hostTemplate included in the SBD file.

According to aspects of the disclosure, for a segment URL of an element, if the element and/or a parent of the element include an SBD descriptor indicating a URL modification process, the segment URL can be processed by the SBD client for the URL modification. Accordingly, if each of the element and the parent(s) of the element includes an SBD descriptor indicating the URL modification process and corresponds to a different SBD file, multiple SBD files can be used by the SBD client for the modification of the segment URL.

TABLE 1

| Element or Attribute Name | Use | Description |
|---|---|---|
| EssentialProperty | | instantiation of EssentialProperty (defined in ISO/IEC 23009-1) for session-based DASH operations |
| @schemeIdUri | M (string) | shall be set to "urn:mpeg:dash:sbd:2020". |
| @value | M (string) | URL of the SBD document for this session |
| @urlClass | OD (default: "segment") | specifies which HTTP GET requests shall be the subject to SBD processing. Value is a white spaced concatenated list of the following keys: 1) "segment" (all segment requests)", 2) "xlink" (all XLink resolution requests), 3) "mpd" (all MPD requests), 4) "callback" (all requests triggered by DASH callback events), 5) "chaining" (requests for chained-to MPDs, 6) "fallback" (requests for the alternative MPDs. Each key defines an URL class. Each URL class defines a collocation of URLs that its members are used to request a different class of resources, such as the class of segments, the class of Xlink resolutions, and etc. Default value is "segment", i.e. only segment URLs are subject to SBD processing. |
| @template | O | template for applying to the key-value pair found in SBD document. For each Key@name in the template, when the value of a Key@name is found in the SBD document, its corresponding key-value pair of SBD document shall replace the string '$'Key@name'$', where '$' is unescaped '$, in the @template. The result, after applying the replacements for all '$'Key@name'$' in the @template, is added to the end of given URL The @template value shall have no whitespace characters. If absent, for each Key@name, the Key@name and its corresponding value in the SBD document separated by '=' shall be added to the end of the given URL query, where each consecutive key-value pairs are separated by '&'. The order of key-value pairs is defined by the order of Key elements in this descriptor. |
| @hostTemplate | O | host template for applying to the value found in SBD document. For each Host@name in the template, when the value of a Host@name is found in the SBD document, its corresponding value of SBD document shall replace the string '$'Host@name'$', where '$' is unescaped '$', in the @hostTemplate. The result, after applying the replacements for all '$'Host@name'$' in the @hostTemplate, replaces the given URL's host (as defined in RFC 3986). The @hostTemplate value shall have no whitespace characters. If absent, for each Host@name that occurs at least once in the given URL's host, as well as found in the SBD document, the corresponding value in the SBD document shall replace the first occurrence of the @name of the given URL's host. |
| @portTemplate | O | port template for applying to the value found in SBD document. For each Port@name in the template, when the value of a Port@name is found in the SBD document, its corresponding value of SBD document shall replace the string '$'Port@name'$', where '$' is unescaped '$', in the @portTemplate. The result, after applying the replacements for all '$'Port@name'$' in the @portTemplate, replaces the given URL's port (as defined in RFC 3986). The @portTemplate value shall have no whitespace characters. If absent, for each port@name that occurs at least once in the given URL's port, as well as found in the SBD document, the corresponding value in the SBD document shall replace the first occurrence of @name of the given URL's port. |
| @pathTemplate | O | path template for applying to the value found in SBD document. For each Path@name in the template, when the value of a Path@name is found in the SBD document, its corresponding value of SBD document shall replace the string '$'Path@name'$', where '$' is unescaped '$', in the @pathTemplate. The result, after applying the replacements for all '$'Path@name'$' in the @pathTemplate, replaces the given URL's path (as defined in RFC 3986). The @pathTemplate value shall have no whitespace characters. If absent, for each path@name that occurs at least once in the given URL's path, as well as found in the SBD document, the corresponding value in the SBD document shall replace the first occurrence of the @name of the given URL's path. |
| @fragmentTemplate | O | fragment template for applying to the value found in SBD document. For each Fragment@name in the template, when the value of a |

TABLE 1-continued

| Element or Attribute Name | Use | Description |
|---|---|---|
| | | Fragment@name is found in the SBD document, its corresponding value of SBD document shall replace the string '$'Fragment@name'$', where '$' is unescaped '$', in the @fragmentTemplate. The result, after applying the replacements for all '$'Fragment@name'$' in the @fragmentTemplate, replaces the given URL's path (as defined in RFC 3986). The @fragmentTemplate value shall have no whitespace characters. If absent, for each Fragment@name that occurs at least once in the given URL's fragment, as well as found in the SBD document, the corresponding value in the SBD document shall replace the first occurrence of the @name of the given URL's fragment. |
| @urlMatch | OD Default: 'false' | If 'true' and any of the URL host, path or port is not replaced, then other parts are also not replaced, and the given URL remains unchanged. |
| @hostMatch | OD Default: 'false' | If 'true' and any key of @hostTemplate not found in the SBD document, then the given URL host remains unchanged. |
| @portMatch | OD Default: 'false' | If 'true' and any key of @portTemplate not found in the SBD document, then the given URL port remains unchanged. |
| @pathMatch | OD Default: 'false' | If 'true' and any key of @pathTemplate not found in the SBD document, then the given URL path remains unchanged. |
| @fragmentMatch | OD Default: 'false' | If 'true' and any key of @fragmentTemplate not found in the SBD document, then the given URL fragment remains unchanged. |
| Key | 1 ... N | a key name to be found in SBD document and its default value. If absent, all keys and corresponding values in the corresponding keyList of the SBD document shall be added to the (sub)segment request URL query. |
| @name | M | Name of the key of the SBD document to be added to the queries for this session after processing described by @template. This value shall be a string without whitespaces, start with a letter, and contain only unreserved characters per RFC 3986. If @name value does not appear in the keyList of SBD document, the @name value-@defaultValue value pair shall be used in the template or in the absence of the template. |
| @defaultValue | OD ('null') | default value in key-value pair if @name value not found in SBD document or if there is no value defined for a requested time range or segment number in the SBD document. |
| Host | 0 ... N | a set of URL host keys to be found in SBD document and its default value. |
| @name | O | URI host key for SBD processing. This value shall be a string without whitespaces, start with a letter, and contain only unreserved characters per RFC 3986. |
| @default | O | The default host if the host key is not found in SBD |
| Port | 0 ... N | a set of URL port keys to be found in SBD document and its default value. |
| @name | O | URI port key SBD processing. This value shall be a string without whitespaces, start with a letter, and contain only unreserved characters per RFC 3986. |
| @default | O | The default port if the port key is not found in SBD |
| Path | 0 ... N | a set of URL path keys to be found in SBD document and its default value. |
| @name | O | URI path key SBD processing. This value shall be a string without whitespaces, start with a letter, and contain only unreserved characters per RFC 3986. |
| @default | O | The default path if the path key is not found in SBD |
| Fragment | 0 ... N | a set of URL fragment keys to be found in SBD document and its default value. |
| @fragment | O | URI fragment key SBD processing. This value shall be a string without whitespaces, start with a letter, and contain only unreserved characters per RFC 3986. |
| @default | O | The default fragment if the path key is not found in SBD |

Legend:
For attributes: M = Mandatory, O = Optional, OD = Optional with Default Value, CM = Conditionally Mandatory.
For elements: <minOccurs> ... <maxOccurs> (N = unbounded)
Elements are bold;
attributes are non-bold and preceded with an @.

This disclosure includes a method of customizing a part of a URL with multiple keys. The URL part can be a host part, a port part, a path part, or a fragment part of the URL. For each part, a set of one or more keys and optionally the corresponding default values can be included in an SBD descriptor in an MPD file. An SBD client can go through an SBD file for each key to find a matched value of the respective key in the SBD file and replace a part of a template corresponding to the URL part with the matched value included in the SBD file. If the match valued is not included in the SBD file, the part of the template corresponding to the URL part can be replaced with a default value.

This disclosure includes a method of adding a fragment template in an SBD descriptor for a URL fragment. A replacing process can be applied to a URL fragment based on the fragment template. The SBD descriptor includes a set of one or more keys and the corresponding default values for the URL fragment. An SBD client can search a value matched to each of the set of keys in an SBD file and apply the matched value to a corresponding part of the fragment template. In this way, the URL fragment can be replaced with the processed fragment template.

This disclosure includes a method of manipulating a URL instead of replacing a part of the URL with a processed template. If a key is included in the part of the URL and is also included in an SBD file, a corresponding value in the SBD file can be used to replace a first occurrence of the key in the part of the URL.

This disclosure includes a method of signaling that only a full match of all keys for a URL part is acceptable. That is, if one or more keys for the URL part are not included in an SBD file, then the URL part is not replaced. The signaling can be provided on a URL part basis such that this constraint is not necessarily applied to each of the URL parts for the URL.

This disclosure includes a method of signaling that only a full match of all parts of a URL is acceptable. In an embodiment, if one or more parts of the URL are not replaced with a new one resulted by an SBD process, then the other replaced part(s) of the URL is not acceptable either and the entire URL shall not be changed. In an embodiment, if the essential property descriptor included in the MPD file indicates that only a subset of (but not all) the parts of the URL is to be modified, then the entire URL shall not be changed. For example, if the template and/or key list corresponding to a URL part are not included in the essential property descriptor, then the URL part is not to be modified, then the entire URL shall not be changed even the other URL part(s) are modified.

IV. Flowchart

Figure 4:
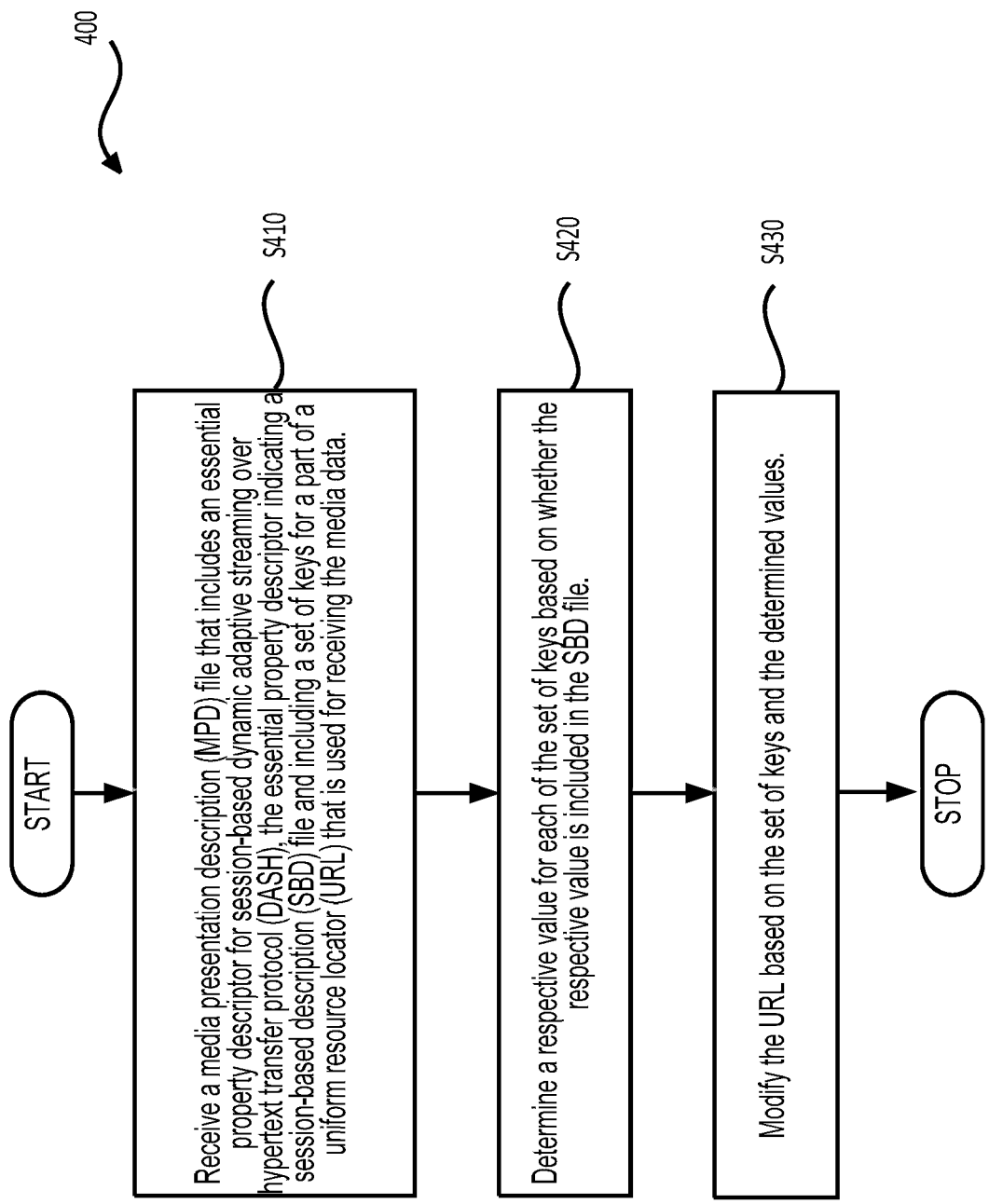
FIG. 4 shows a flow chart outlining a process example in accordance with some embodiments.

FIG. 4 shows a flow chart outlining a process (400) according to an embodiment of the disclosure. In various embodiments, the process (400) is executed by processing circuitry, such as the processing circuitry in the DASH client (102). In some embodiments, the process (400) is implemented in software instructions, thus when the processing circuitry executes the software instructions, the processing circuitry performs the process (400). The process (400) starts at (S410), where the process (400) receives an MPD file that includes an essential property descriptor for session-based DASH. The essential property descriptor indicates an SBD file and includes a set of keys for a part of a URL that is used for receiving the media data. Then, the process (400) proceeds to step (S420).

At step (S420), the process (400) determines a respective value for each of the set of keys based on whether the respective value is included in the SBD file. Then, the process (400) proceeds to step (S430).

At step (S430), the process (400) modifies the URL based on the set of keys and the determined values. Then, the process (400) terminates.

In an embodiment, the part of the URL is one of a host part, a port part, a path part, and a fragment part of the URL.

In an embodiment, the set of keys is one of (i) a set of URL host keys, (ii) a set of URL port keys, (iii) a set of URL path keys, and (iv) a set of URL fragments keys.

In an embodiment, the process (400) determines whether a value for one of the set of keys is included in the SBD file. The process (400) determines the value included in the SBD file for the one of the set of keys based on the value for the one of the set of keys being included in the SBD file. The process (400) determines the value for the one of the set of keys to be a default value based on the value for the one of the set of keys not being included in the SBD file. The default value is included in the essential property descriptor.

In an embodiment, the set of keys is indicated by a template included in the essential property descriptor. The process (400) processes the template based on the determined values. The template corresponds to the part of the URL. The process (400) modifies the URL based on the processed template.

In an embodiment, the template is a fragment template based on the part of the URL being a fragment part.

In an embodiment, the set of keys is included in the part of the URL and indicated by a key element that is included in the essential property descriptor and corresponds to the part of the URL. The process (400) replaces, for each of the set of keys, a first occurrence of the respective key in the part of the URL with the determined corresponding value.

In an embodiment, the key element is one of a URL host key element, a URL port key element, a URL path key element, and a URL fragment key element.

In an embodiment, the part of the URL is one of a plurality of parts of the URL, and the essential property descriptor includes a first flag indicating whether a full match of all the parts of the URL is required. The process (400) determines that the URL is not to be modified based on at least one part of the URL not being modified and the first flag indicating that the full match of all parts of the URL is required. The process (400) determines that the URL is to be modified based on the at least one part of the URL being modified and the first flag indicating that the full match of all parts of the URL is not required.

In an embodiment, the essential property descriptor includes a second flag indicating whether a full match of all keys for the part of the URL is required. The process (400) determines that the part of the URL is not to be modified based on at least one key for the part of the URL not being included in the SBD file and the second flag indicating that the full match of all keys for the part of the URL is required. The process (400) determines that the part of the URL is to be modified based on the at least one key for the part of the URL being included in the SBD file and the second flag indicating that the full match of all keys for the part of the URL is not required.

V. Computer System

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
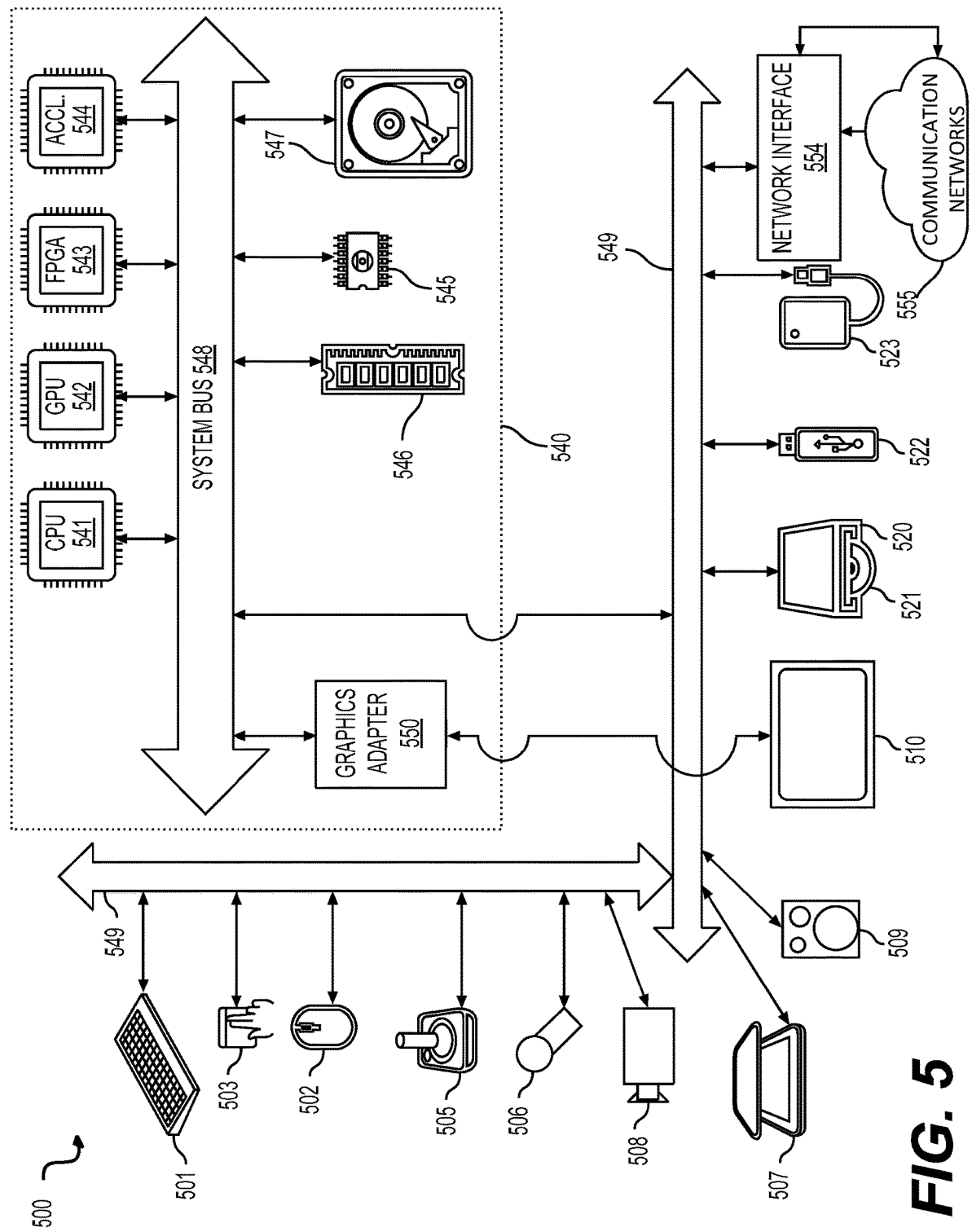
FIG. 5 is a schematic illustration of a computer system in accordance with an embodiment.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), and camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (510)) can be connected to a system bus (548) through a graphics adapter (550).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include a network interface (554) to one or more communication networks (555). The one or more communication networks (555) can for example be wireless, wireline, optical. The one or more communication networks (555) can further be local, wide-area, metropolitan, vehicular and industrial, real-time, delay-tolerant, and so on. Examples of the one or more communication networks (555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), and so forth. These devices, along with Read-only memory (ROM) (545), Random-access memory (546), internal mass storage such as internal non-user accessible hard drives, SSDs, and the like (547), may be connected through the system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can be also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500) and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of receiving media data, comprising:
receiving a media presentation description (MPD) file that includes an essential property descriptor for session-based dynamic adaptive streaming over hypertext transfer protocol (DASH), the essential property descriptor indicating a session-based description (SBD) file and including a set of keys for a part of a uniform resource locator (URL) that is used for receiving the media data;
determining a respective value for each of the set of keys based on whether the respective value is included in the SBD file; and
modifying the URL based on the set of keys and the determined values.

2. The method of claim 1, wherein the part of the URL is one of a host part, a port part, a path part, and a fragment part of the URL.

3. The method of claim 1, wherein the set of keys is one of (i) a set of URL host keys, (ii) a set of URL port keys, (iii) a set of URL path keys, and (iv) a set of URL fragments keys.

4. The method of claim 1, wherein the determining includes:
determining whether a value for one of the set of keys is included in the SBD file;
determining the value included in the SBD file for the one of the set of keys based on the value for the one of the set of keys being included in the SBD file; and
determining the value for the one of the set of keys to be a default value based on the value for the one of the set of keys not being included in the SBD file, the default value being included in the essential property descriptor.

5. The method of claim 1, wherein the set of keys is indicated by a template included in the essential property descriptor, and the modifying includes:
processing the template based on the determined values, the template corresponding to the part of the URL; and
modifying the URL based on the processed template.

6. The method of claim 5, wherein the template is a fragment template based on the part of the URL being a fragment part.

7. The method of claim 1, wherein the set of keys is included in the part of the URL and indicated by a key element that is included in the essential property descriptor and corresponds to the part of the URL, and the modifying includes:
replacing, for each of the set of keys, a first occurrence of the respective key in the part of the URL with the determined corresponding value.

8. The method of claim 1, wherein the key element is one of a URL host key element, a URL port key element, a URL path key element, and a URL fragment key element.

9. The method of claim 1, wherein
the part of the URL is one of a plurality of parts of the URL,
the essential property descriptor includes a first flag indicating whether a full match of all the parts of the URL is required, and
the method further comprises:
determining that the URL is not to be modified based on at least one part of the URL not being modified and the first flag indicating that the full match of all parts of the URL is required; and
determining that the URL is to be modified based on the at least one part of the URL being modified and the first flag indicating that the full match of all parts of the URL is not required.

10. The method of claim 1, wherein
the essential property descriptor includes a second flag indicating whether a full match of all keys for the part of the URL is required, and
the method further comprises:
determining that the part of the URL is not to be modified based on at least one key for the part of the URL not being included in the SBD file and the second flag indicating that the full match of all keys for the part of the URL is required; and
determining that the part of the URL is to be modified based on the at least one key for the part of the URL being included in the SBD file and the second flag indicating that the full match of all keys for the part of the URL is not required.

11. An apparatus for receiving media data, the apparatus comprising processing circuitry configured to:
receive a media presentation description (MPD) file that includes an essential property descriptor for session-based dynamic adaptive streaming over hypertext transfer protocol (DASH), the essential property descriptor indicating a session-based description (SBD) file and including a set of keys for a part of a uniform resource locator (URL) that is used for receiving the media data;
determine a respective value for each of the set of keys based on whether the respective value is included in the SBD file; and
modify the URL based on the set of keys and the determined values.

12. The apparatus of claim 11, wherein the part of the URL is one of a host part, a port part, a path part, and a fragment part of the URL, and the set of keys is one of (i) a set of URL host keys, (ii) a set of URL port keys, (iii) a set of URL path keys, and (iv) a set of URL fragments keys.

13. The apparatus of claim 11, wherein the processing circuitry is further configured to:
determine whether a value for one of the set of keys is included in the SBD file;
determine the value included in the SBD file for the one of the set of keys based on the value for the one of the set of keys being included in the SBD file; and determine the value for the one of the set of keys to be a default value based on the value for the one of the set of keys not being included in the SBD file, the default value being included in the essential property descriptor.

14. The apparatus of claim 11, wherein the set of keys is indicated by a template included in the essential property descriptor, and the processing circuitry is further configured to:
   process the template based on the determined values, the template corresponding to the part of the URL; and
   modify the URL based on the processed template.

15. The apparatus of claim 14, wherein the template is a fragment template based on the part of the URL being a fragment part.

16. The apparatus of claim 11, wherein the set of keys is included in the part of the URL and indicated by a key element that is included in the essential property descriptor and corresponds to the part of the URL, and the processing circuitry is further configured to:
   replace, for each of the set of keys, a first occurrence of the respective key in the part of the URL with the determined corresponding value.

17. The apparatus of claim 11, wherein the key element is one of a URL host key element, a URL port key element, a URL path key element, and a URL fragment key element.

18. The apparatus of claim 11, wherein the part of the URL is one of a plurality of parts of the URL, the essential property descriptor includes a first flag indicating whether a full match of all parts of the URL is required, and the processing circuitry is further configured to:
   determine that the URL is not to be modified based on at least one part of the URL not being modified and the first flag indicating that the full match of all parts of the URL is required; and
   determine that the URL is to be modified based on the at least one part of the URL being modified and the first flag indicating that the full match of all parts of the URL is not required.

19. The apparatus of claim 11, wherein the essential property descriptor includes a second flag indicating whether a full match of all keys for the part of the URL is required, and the processing circuitry is further configured to:
   determine that the part of the URL is not to be modified based on at least one key for the part of the URL not being included in the SBD file and the second flag indicating that the full match of all keys for the part of the URL is required; and
   determine that the part of the URL is to be modified based on the at least one key for the part of the URL being included in the SBD file and the second flag indicating that the full match of all keys for the part of the URL is not required.

20. A non-transitory computer-readable storage medium storing instructions which when executed by a computer for receiving media data cause the computer to perform:
   receiving a media presentation description (MPD) file that includes an essential property descriptor for session-based dynamic adaptive streaming over hypertext transfer protocol (DASH), the essential property descriptor indicating a session-based description (SBD) file and including a set of keys for a part of a uniform resource locator (URL) that is used for receiving the media data;
   determining a respective value for each of the set of keys based on whether the respective value is included in the SBD file; and
   modifying the URL based on the set of keys and the determined values.

* * * * *